US008725507B2

(12) United States Patent
Cortez et al.

(10) Patent No.: US 8,725,507 B2
(45) Date of Patent: May 13, 2014

(54) SYSTEMS AND METHODS FOR SYNTHESIS OF MOTION FOR ANIMATION OF VIRTUAL HEADS/CHARACTERS VIA VOICE PROCESSING IN PORTABLE DEVICES

(75) Inventors: Paulo Cesar Cortez, Fortaleza (BR); Rodrigo Carvalho Souza Costa, Fortaleza (BR); Robson Da Silva Siqueira, Eusebio (BR); Cincinato Furtado Leite Neto, Fortaleza (BR); Fabio Cisne Ribeiro, Fortaleza (BR); Francisco Jose Marques Anselmo, Fortaleza (BR); Raphael Torres Santos Carvalho, Fortaleza (BR); Antonio Carlos Da Silva Barros, Fortaleza (BR); Cesar Lincoln Cavalcante Mattos, Fortaleza (BR); Jose Marques Soares, Fortaleza (BR)

(73) Assignee: Samsung Eletronica da Amazonia Ltda., Manaus-Am (BR)

( * ) Notice: Subject to any disclaimer, the term of this patent is extended or adjusted under 35 U.S.C. 154(b) by 336 days.

(21) Appl. No.: 12/819,164

(22) Filed: Jun. 18, 2010

(65) Prior Publication Data

US 2011/0131041 A1    Jun. 2, 2011

(30) Foreign Application Priority Data

Nov. 27, 2009    (BR) ..................................... 0904540

(51) Int. Cl.
| | | |
|---|---|---|
| *G10L 15/00* | (2013.01) | |
| *G06T 13/00* | (2011.01) | |
| *G10L 21/0356* | (2013.01) | |
| *G06T 13/20* | (2011.01) | |

(52) U.S. Cl.
CPC ........... *G10L 21/0356* (2013.01); *G06T 13/205* (2013.01)

USPC ............................................ 704/235; 345/473

(58) Field of Classification Search
CPC ........................... G10L 21/0356; G06T 13/205
See application file for complete search history.

(56) References Cited

U.S. PATENT DOCUMENTS

| | | | | |
|---|---|---|---|---|
| 4,464,783 A | * | 8/1984 | Beraud et al. ................. | 704/212 |
| 4,642,710 A | * | 2/1987 | Murtha et al. .................. | 360/79 |
| 4,900,289 A | * | 2/1990 | May et al. ..................... | 446/342 |
| 4,979,212 A | * | 12/1990 | Yamada et al. ............... | 704/234 |
| 6,181,351 B1 | * | 1/2001 | Merrill et al. ................. | 345/473 |
| 6,665,643 B1 | * | 12/2003 | Lande et al. .................. | 704/266 |
| 6,909,453 B2 | * | 6/2005 | Mochizuki et al. .......... | 348/14.1 |
| 6,965,860 B1 | * | 11/2005 | Rees et al. .................... | 704/227 |
| 7,149,686 B1 | * | 12/2006 | Cohen et al. .................. | 704/241 |
| 7,433,490 B2 | * | 10/2008 | Huang et al. .................. | 382/100 |
| 7,640,159 B2 | * | 12/2009 | Reich ............................ | 704/254 |
| 8,421,805 B2 | * | 4/2013 | Bishop ......................... | 345/473 |
| 2008/0259085 A1 | * | 10/2008 | Chen et al. .................... | 345/473 |
| 2010/0094634 A1 | * | 4/2010 | Park ............................. | 704/270 |

OTHER PUBLICATIONS

Lee et al., "Eyes Alive", Proceedings of the 29th annual conference on Computer graphics and interactive techniques, SIGGRAPH'02, pp. 637-644, 2002.*

* cited by examiner

*Primary Examiner* — Brian Albertalli (57) ABSTRACT

Systems and methods consistent with the innovations herein relate to communication using a virtual humanoid animated during call processing. According to one exemplary implementation, the animation may be performed using a system of recognition of spoken vowels for animation of the lips, which may also be associated with the recognition of DTMF tones for animation of head movements and facial features. The innovations herein may be generally implemented in portable devices such as PDAs, cell phones and Smart Phones that have access to mobile telephony.

19 Claims, 6 Drawing Sheets

SYSTEMS AND METHODS FOR SYNTHESIS OF MOTION FOR ANIMATION OF VIRTUAL HEADS/CHARACTERS VIA VOICE PROCESSING IN PORTABLE DEVICES

CROSS REFERENCE TO RELATED APPLICATIONS

This application claims benefit and priority of Brazilian application No. PI 0904540-6, filed Nov. 27, 2009, which is incorporated herein by reference in entirety.

BACKGROUND

1. Field

Aspects of the present innovations relate to a system of audio-visual communication method that uses portable devices. For example, communication may be facilitated via a virtual 3D animated humanoid from voice recognition pattern techniques applied to an audio channel.

2. Description of Related Information

Today many interactive systems use graphical implementation of talking faces to communicate with the end user. For example, applications such as answering machines, electronic storytellers and virtual reality have gained more attention by playing the voice synchronized with a realistic facial motion.

Computer-animated characters can be represented in two or three dimensions. They are known as virtual humanoids or avatars, which can be controlled by different techniques. For example, you can animate an avatar by means of commands found in graphical interfaces, in which the user must choose the commands among a finite set of buttons or via a mouse or keyboard.

The MPEG4 encoding provides means for implementing a virtual humanoid. In this coding, there are special parameters that allow the generation and transmission of video of a synthetic "talking head" for multimedia communication.

The MPEG4 encoding includes a set of Facial Animation Parameter (FAP). These parameters were designed based on the study of small facial actions, and are related to the motion performed by the muscles of the face. This encoding is capable of reproducing facial expressions and head movements made by a person.

These expressions can be grouped into two categories: simple and complex. Examples of the first expressions are: blinking, opening and closing the mouth, raise eyebrows. Complex expressions represent emotions such as, happiness, sadness and scare.

The visual representation of a phoneme is a viseme. Visemes are used for facial animation synchronized with speech, i.e., the shape of the lip, while a phoneme is pronounced.

Several methods of artificial vision using the features of lip pigmentation to make their detection and from the segmentation, assess the shape of lip to recognize the viseme.

However, the contrast between the colors of lips (not decorated) and the facial region is too small. This hinders the segmentation of the lips and makes the contour of the same very inaccurate and therefore extracting the characteristics of the lips does not seem efficient. For this reason, recognition of the shape of the mouth through techniques of computer vision is a complex task. Moreover, with the lips adorned (i.e., using lipstick, for example), it becomes even more complex due to a variety of colors available, complicating even further the design of an automated system for identification of visemes.

There are other additional difficulties, which are related to the quality of the image acquired by the digital camera. In the particular case of cameras integrated into portable devices such as mobile phones, Smart Phones and PDAs, the exposure time of the sensing elements makes the image obtained "blurred" due to the motion. Therefore, to achieve a good definition of the movements of the mouth, it is necessary that the mouth takes a large portion of the image to allow an efficient estimation of the shape of lips. In doing so the camera does not capture other important parts of the face that are very important for communication.

Therefore, a system for automatic recognition of lip format requires a high computational cost to perform the steps of detection and identification of shapes. In any electronic device, a high computational cost causes an increase in energy consumption and increased heat production.

In portable devices, a high consumption of energy causes the battery to discharge faster and its prolonged use causes a decrease in battery lifetime, since a battery has a finite number of recharges. For example, a battery of a portable device can last about 300 hours in standby and 7 hours in talking time.

As the computational cost to process the video is much higher than the costs necessary to make a conventional call, it is expected that the battery lifetime is much lower, reaching a maximum of two hours of use.

Because of the above described problems, methods based on artificial vision are concentrated in detecting the mouth only, for example, open or closed. Since speech perception depends not only on acoustic information, the format of mouth helps in speech intelligibility. For example, in noisy environments, the shape of the mouth can compensate for some loss of a syllable in the audio channel.

Thus, a more realistic way to make the communication through a virtual humanoid is to use voice to animate the motion of the mouth, leaving the other facial gestures (blinking, changing the look and eyebrow) as a function of the recognition of tones DTMF.

An efficient visual animation of the motion made by the mouth is useful for many applications, for example, the training of speech of people with hearing difficulties, production of movies and games, forms of interaction through virtual agents and electronic commerce.

The methods for developing this type of animation are based on mathematical parameters, on physical characteristics of the face in artificial vision and on audio processing.

An example of a methodology for tracking lip movements through computer vision was proposed by A. W. Senior work titled "Face and Feature Finding for a Face Recognition System" published in the International Conference on Audio and Video-based Biometric Person Authentication" p. 154-159 in March 1999. In this paper, it was made a search for the area of the face using a set of template windows of face and facial feature candidates. By means of a pyramidal analysis (multi-resolution), obtained through the scale of template windows, it is located the face and then the process is repeated to find the facial elements (eyes, mouth, nose and ears). Information extracted using this method is a set of four points of the corners of the mouth. Through these points, it is identified the width and the height of the mouth that can be used as parameters to define its shape and can be used to animate a virtual humanoid. However, this technique is not advantageous due to the number of combinations of windows made to find the face and the facial elements, making these methods computationally complex, which makes more difficult to implement it in portable devices due to their limited processing power.

The Brazilian patent document PI 9909611-0, applicant: Eyematic Interfaces, Inc, published on Oct. 21, 1999 describes a method for recognizing features for animating an avatar based on Wavelets. This document uses a wavelet series to detect end points of the mouth and, from these points, the tracking of the lip motion is carried out. Each end point of the mouth is found from the application of Wavelet Transform with a specific characteristic. As known by an expert, for applying a wavelet, it is necessary to make several convolutions during the step of identifying important points of the face. For computing the convolution at each point of the image, a large amount of multiplications and sums is needed. This makes the method too complex to be used in portable devices due to their limited memory and processing power.

The article proposed by M-T Yang et. al. titled "Lip Contour Extraction for Language Learning in VEC3D" published in the Journal of Machine Vision and Applications in April 2008 uses the segmentation of the lips through active contours. However, this method is quite robust, and the initial demand of the active contour and the subsequent interactions can take a long time. In applications such as video call, in which the motion of the avatar must be synchronized with the sound, this approach should not be used due to the long duration of the search and subsequent interactions.

Because the lip shape is the main responsible for the vowels formation and they are the main components of the syllable, vowel recognition by the voice processing is able to efficiently identify the shape of the lips and therefore animate the virtual humanoid.

A study of speech recognition that is related to facial motion was proposed by D. V. McAlister et. al entitled "Lip Synchronization for Animation," published in SIGGRAPH in January 1997. This method applies the Fast Fourier Transform (FFT) to extract the features of the voice and, from these features, it performs the animation of the lip motion. Depending on the time of acquisition and sampling rate of the signal, this method can become computationally expensive, and therefore is not advantageous for application in portable devices with low computing power, such as devices having ideal use with the present innovations.

A similar method was proposed by G. Zorica and I. S. Pandzic in the paper entitled "Language Independent Real-Time Lip Synchronization Method Using Genetic Algorithm" published in the Journal of Signal Processing, p. 3644-3656 in December 2006. In this paper, the result of the Fast Fourier Transform (FFT) is converted into a new scale. In the converted signal, it is applied the discrete cosine transform (DCT), and after all these steps, the coefficients are extracted that represent the lip motion. For applications with dedicated processors or in a personal computer environment, the method is able to operate in real time. However, the number of operations needed to perform this procedure is much greater than the method proposed by McAlister, making it impractical for applications in portable devices due to the computational cost of all these operations.

In U.S. Pat. No. 6,735,566, granted on May 11, 2004, there is provided a method that uses speech recognition to a realistic facial animation. This method uses a training associating a video of the mouth to the voice for modeling the lip movements. This method uses a Hidden Markov Model for the extraction of lip features of each spoken sound. This approach has high rates and high liability, however, it is a method of pattern recognition computationally complex, making it impractical due to high computational cost.

Another example of facial animation from the voice has been described in U.S. Pat. No. 6,665,643, granted on Dec. 16, 2003, owner: Telecom Italia Lab SPA. According to the teachings, here, the recognition of spoken phonemes (vowels and consonants) is performed to animate a virtual model. In that patent, each spoken word is transformed into a text and from text, phonemes are identified. This solution is quite efficient, but requires the recognition of many phonemes. The best performance is obtained by identifying the content of the complete spoken message, being suitable for off-line communication.

The article proposed by S. Kshiragas and N. Magnenat-Thalmann entitled "Lip Synchronization Using Linear Predictive Analysis" published in the IEEE in July 2000 carries out the recognition of vowels using the linear predictive coding (LPC—Linear Predictive Coding') for the extraction of features and these are processed by a Neural network.

A similar method was proposed by O. Farooq and S. Datta in his paper entitled "Phoneme Recognition using Wavelet Based Features" in the Journal of Information Sciences vol. 150, p. 5-15 Mar. 2003. This uses the Fast Wavelet Transform to extract the characteristics of the audio signal and also uses a neural network to recognize phonemes in English.

The feature extraction by linear prediction or Wavelet followed by its implementation in a neural network has a low computational complexity. In both methods, the recognition of vowels is made for English speakers. However, it is important to note that the pronunciation in other languages, for example, in Portuguese, has a much greater variety of phonemes. This is due to the fact that a single vowel may have some tonic and nasal variations thanks to the different accents from different regions. Consequently, methods based on linear prediction and wavelet have the disadvantage of generating false recognition due to this variety.

The patent document U.S. 20090158184, applicant: AOL LLC, published on Jun. 18, 2009 claims a system and method for animating an avatar based on an animation perceived in a second avatar, the method comprising the steps of graphically representing a first user with a first avatar capable of being animated, graphically representing a second user with a second avatar capable of being animated, in which communication messages are sent between the first and second user, receiving an indication of an animation of a first avatar, accessing information associating animations of avatar, identifying, based on the accessed information, an animation for the second avatar that is responsive to the indicated animation of the first avatar; and in response to the received indication, animating the second avatar based on the identified responsive animation. According to the teachings of this patent document, the avatar is animated through an application such online messages (like, for example, MSN or Skype). The avatar moves in accordance with the written words on the system. Thus, there is no recognition of sounds.

U.S. Pat. No. 7,176,956, granted on Feb. 13, 2007, owner: MOTOROLA INC, relates to the animation of avatars in communication between portable devices (video call). The avatars are moving through the changes of parameters obtained by techniques of image recognition provided by the camera of the mobile phone.

U.S. Pat. No. 7,231,205, granted on Jun. 12, 2007, holder: Telefonaktiebolaget LM Ericsson relates to the animation of avatars in communication between portable devices. The system is connected to a server that promotes the link between the devices and this is the element that provides the service of avatars. The state of the avatars can be changed via the keypad of the phone, but it do not provide for the recognition of sounds.

U.S. Pat. No. 6,665,640, granted on Dec. 16, 2003, owner: Phoenix Solutions, Inc presents an animated avatar using speech. The avatar uses as FAPs parameters of motion. The FAPs are obtained directly from a MPEG4 stream. This system does not simplify the visemes, nor is optimized for devices with low processing power such as mobile phones of today.

U.S. Pat. No. 7,123,262, granted on Oct. 17, 2006, owner: Telecom Italia Lab SpA uses viseme and generates FAPs over a face previously parameterized with Active Shape Model. According to the document, voice and image are joined to move the model face This does not constitutes an avatar, but a technique of animation of a modeled face. These techniques are generally robust and complex, rendering the implementation impossible in portable devices.

The document WO 2008031955, published on Mar. 20, 2008, describes a method and system for the animation of an avatar on a mobile device based on the sound signal corresponding to the voice of a caller in a telephone conversation. This method offers the look and motion of avatars in real time or quasi real, the avatar being chosen and/or configured through an online service over the network. The system of document WO 2008031955 comprises a mobile communication device, signal reception server, and means for calculating and analyzing the sound signal to move the avatar and simulate real-time conversation.

In sum, however, there are needs for systems and methods that overcome the drawbacks of such disclosures.

BRIEF DESCRIPTION OF FIGURES

The objectives and advantages of the present innovations will become more apparent from the following detailed description of exemplary implementations and attached drawings provided as non-limiting examples, in which.

DESCRIPTION OF EXEMPLARY IMPLEMENTATIONS OF THE INNOVATIONS

Reference will now be made in detail to the inventions herein, examples of which are illustrated in the accompanying drawings. The implementations set forth in the following description do not represent all implementations consistent with the claimed innovations. Instead, they are merely some examples consistent with certain aspects related to these innovations. Wherever possible, the same reference numbers will be used throughout the drawings to refer to the same or like parts.

Features of the present innovations may specify a method of communication using a virtual humanoid animated during conventional calls. According to aspects of the present innovations, the animation may be done using a system of recognition of spoken vowels for animation of the lips, associated with the recognition of DTMF tones for animation of head movements and facial features. This method differs from the known methods for using techniques computationally efficient. This implies optimization work and setting techniques for digital signal processing to enable its implementation in portable devices.

The method described herein can be generally implemented in portable devices such as PDAs, cell phones and Smart Phones that have access to mobile telephony.

One or mote aspects of the present innovations may differ from known solutions by providing the following:

Low computational cost: the accomplished processing have low computational effort and can be used for communication in real time, therefore, in portable devices.

Independence of the intensity of speech: the animation of the mouth opening is made from the energy of the last seconds of communication. Regardless of the intensity (high or low) of the audio signal, the avatar move lips naturally.

Recognition of vowels, also well suited for the recognition of Portuguese: the method was adapted to recognize the vowels under different conditions of regional accents, as occurs, for example in Portuguese.

Synthetic generator of facial expressions: the proposed method has the ability to generate synthetic facial expressions in close proximity to the true facial expressions.

Moving the virtual humanoid through DTMF tones: the proposed method enables the reproduction of head movements and facial expressions using the voice channel, not requiring sending information in data channels for communication.

New forms of video call: one method consistent with these innovations can be used in different applications in order to add value to service calls from conventional mobile operators by means of association of their gestures with the tones of two frequencies used to dial phones (Dual-Tone multifrequencial—DTMF). For example, upon receiving the DTMF tone of key 2, the humanoid blinks his left eye. DTMF tones are formed from the combination of two electrical impulses of specified frequencies. The probability of the human voice to generate a combination of the two frequencies used in this pattern is very low and, therefore, they are easy to be detected and filtered.

In accordance with the principle(s) illustrated above, aspects of the present innovations may makes communication more pleasant in audio calls, since the system is capable of passing the sensation to the user of a conversation using video-call. By the use of this system, it would not be necessary to acquire the video, compress it and send data over the network.

Moreover, the humanoid can make possible to elderly people and those with hearing difficulties to better understand the conversation, because the perception of speech does not depend only on acoustic information. Visual information, for example, the lip movements and facial expressions influence the perception of the spoken information.

Features of one or more aspects of the innovations herein include that insertion of new features into portable and mobile devices may be enabled without the need of change in their designs, either in its mounting card or by adding extra keys to their layout. Such changes can be made, for example, without the addition of an intermediary server for data processing, which enables the use of the present innovations on devices currently on the market upon a simple software upgrade.

Aspects of the innovations herein may also provide a new feature to the portable devices existing on the market through its use in accessing the mobile voice mail, virtual assistants or in receive calls. For example, a virtual attendant could interact with the user depending on the commands sent by the user. In this case, upon pressing a button that is not within the available options in the service, the avatar begins to shake his head indicating to the user that he did something wrong or it makes sad faces.

To reduce the computational effort and make it possible to use in a portable device, consistent with aspects of the innovations herein, vowels may be used to animate the virtual humanoid. Here, for example, a vowel may be the basis of the syllable and its emission is basically done by lip motion. For example, to make the lips stay with the shape used to pronounce the vowel "o", it is not possible pronounce any of the other vowels. Furthermore, aspects of the innovations herein may be adapted to a method of extracting features optimized for languages with a plurality of phonological variations, for example, Brazilian Portuguese, adjusting to make the method robust to these accents variations.

Figure 1:
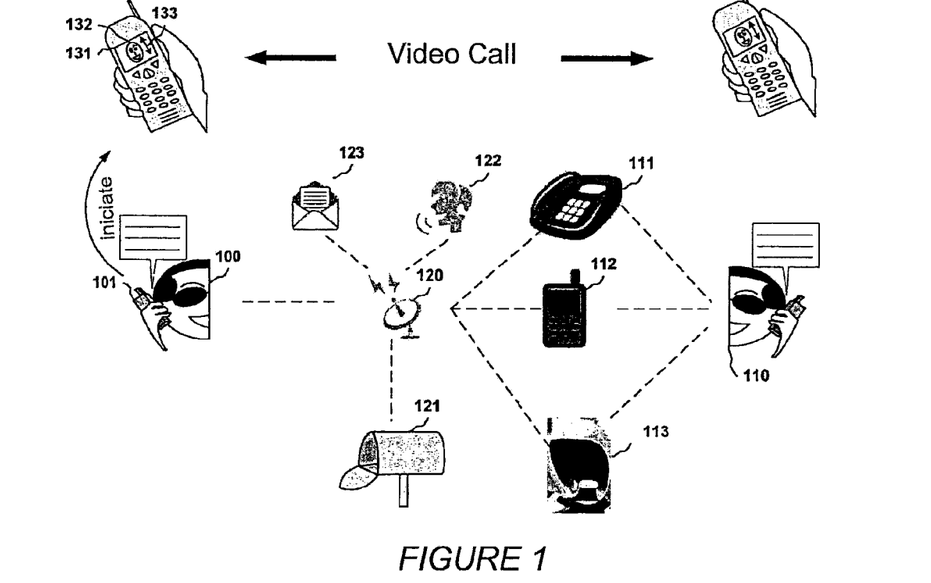
FIG. 1 illustrates a schematic diagram of the operation of an exemplary system consistent with aspects of the innovations herein.

FIG. 1 illustrates features and operation of an exemplary system consistent with aspects of the innovations herein. A user 100 performs a conventional call by using a portable device 101. This call can be made between the portable device and a user 110 using a conventional phone 111 or a mobile phone 112. Moreover, the user 100 can use the proposed system to access services from mobile operator 120, for example, voice mail 121, other self-service 122, etc., or to play voice messages 123.

During the call, the user 100 is free to initiate features or functionality consistent with the systems and methods herein and view the virtual humanoid. In some implementations, for example, as syllables are recognized, the mouth of the humanoid and other aspects may be animated on the screen 131 of portable device 101. Eventually, upon receiving a DTMF tone, the portable device 101 performs the modification of the humanoid feature 132 or activates a specific gesture 133. If the two devices used in the communication have the proposed system, both may have the feeling of a video call, in which each customer can control the features of the virtual humanoid and the mouth is animated by the proposed system. This will make interesting and funny traditional calls because emotions and feelings will be better understood through the use of the virtual humanoid, as well as it will assist in the intelligibility of communication for people who have some difficulty in hearing caused by noise from the environment.

Figure 2:
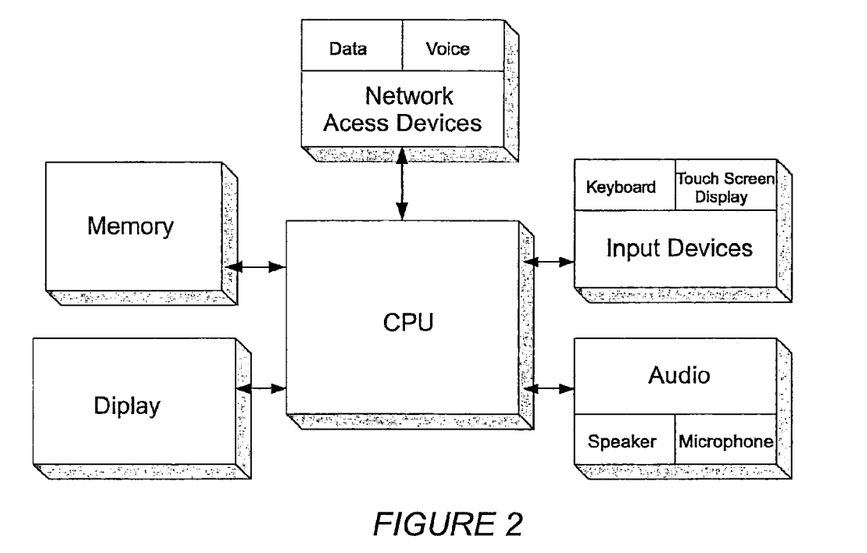
FIG. 2 illustrates a generic model of portable device, in which aspects of the present innovations may be implemented.

According to one exemplary implementation, the computing device may comprise a central processing unit or other processing element to perform computer instructions with memory for storing information and instructions, a display or other device that provides visual information output, a keyboard or other input device for entering information, one or more audio I/O components such as microphone and speaker, and components that provide access to mobile telephone network, as shown in FIG. 2.

Systems and methods herein may allow the animation of the movements of the head, the selection of features and recognition of lip movements.

Figure 3:
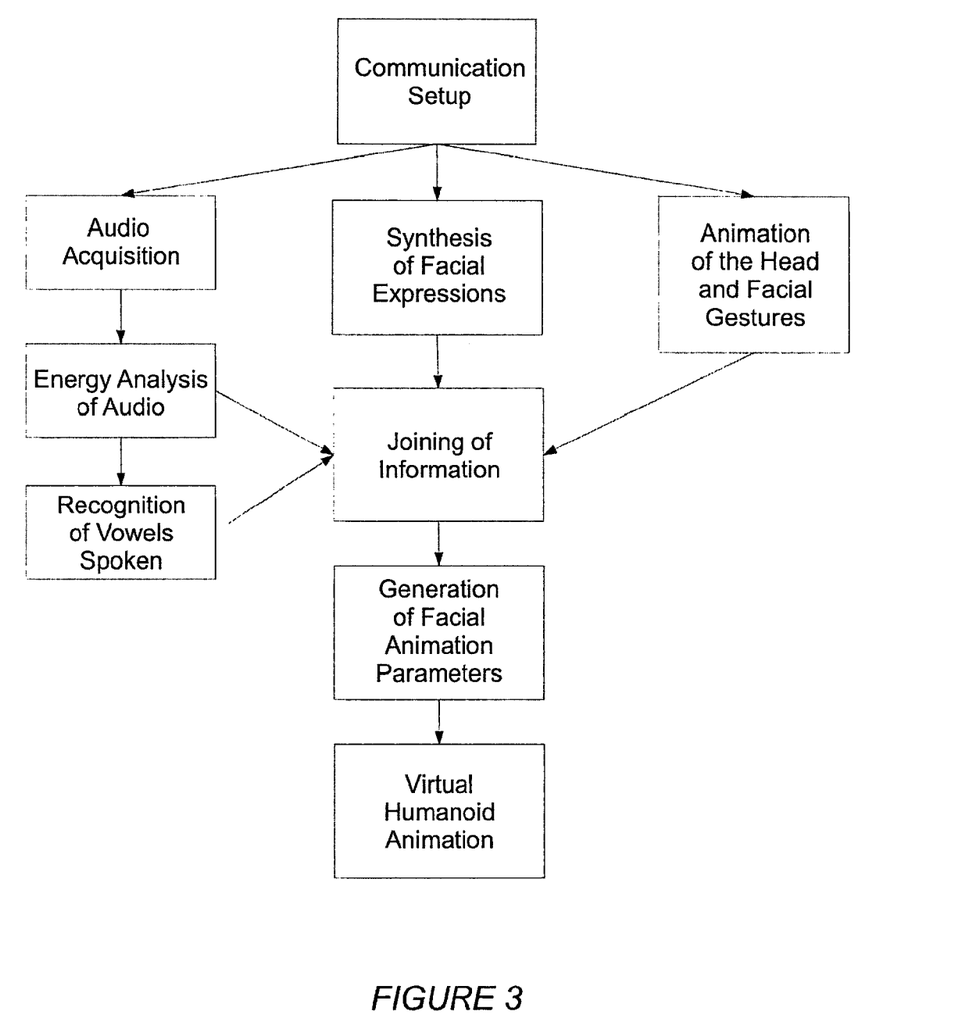
FIG. 3 illustrates a block diagram of the method for animating the virtual humanoid consistent with aspects of the innovations herein.

Systems and methods consistent with the present innovations may use FAP parameters to animate the virtual humanoid. These FAP parameters comprise a set of 68 parameters that define the change in shape or facial movements. Speech recognition methods consistent with the innovations herein may combine a series of algorithms in order to improve its robustness and computational effort in order to make them usable in devices with restricted computing power, most notably, portable devices. Such methods may be divided for ease of explanation not limitation as shown in FIG. 3 and may include one or more of the following steps:

1. Communication Setup: In this step, user personal choices are assessed. The user has the freedom to associate an avatar from a set of virtual humanoids available in the portable device that resembles a contact in his/her phonebook. Thus, when receiving a call or a voice mail message from this user, the user is asked whether he/she wishes to activate the animation of the virtual humanoid. If the user would like this type of communication, the associated avatar is used for communication. Moreover, among the available virtual humanoids, there are those unique to the mobile operators, in which each operator has a humanoid specific and upon using the proposed system to access any service accessed by mobile phone user.

2. Audio acquisition: this step is performed to acquire the received audio (MMS or conventional call) in a standardized format for use in other recognition steps.

3. Energy Analysis of Audio: The proposed method analyzes the energy ratio of the signal in a fixed amount of samples of the audio signal. This amount forms what we call an audio frame. It is calculated a ratio between the energy of current frame and previous ones within a window of time to dimension how much the mouth is open.

4. Recognition of vowels spoken: in this step, audio frames are analyzed to recognize spoken vowels. This step performs extraction of the audio signal feature and applies them in a progressive neural network (feed forward propagation) with fixed weights, generated from a training done outside of the portable device using a set of audio samples. This type of solution was chosen due to its low computational cost. A nuance of aspects of the innovations herein over the known methods is to optimize the method of characteristic extraction for the recognition of spoken vowels in different tones and accents of Portuguese.

5. Synthesis of facial expressions: At this step, some specific facial gestures are artificially generated that simulate natural movements made by a person. For example, as we blink many times throughout the day, this motion can be simulated through a random process and used to animate the eyes and the look of the virtual humanoid.

6. Animation of the head and facial gestures: In this step, we recognize the DTMF tones received in the audio channel. After recognition of the received tone, the feature is configured or facial movements pre-defined.

7. Fusion of Information: In this step, the information generated artificially are those recognized are organized to form a single information that will be used during the animation of the virtual humanoid. This step performs an analysis of priorities between each received information. In the information, the recognized vowel has higher priority than the facial features recognized by DTMF tones. While the user is talking, the lip shape is controlled by the recognition of vowels and, otherwise, the format is controlled from the feature selected by the DTMF tone.

8. Generation of Facial Animation Parameters: In this step of processing, the instructions are converted into FAP parameters, using the information defined in the previous step. For example, the shape of lips is dependent on four characteristic points of the mouth. Upon receiving the instruction of a mouth pronouncing the vowel "A", a package FAP is generated, in which the four points that define the mouth are identified and these are sent to the animation of the humanoid.

9. Virtual humanoid animation: this step is performed to change the features of the humanoid through the received FAP parameters.

Figure 4:
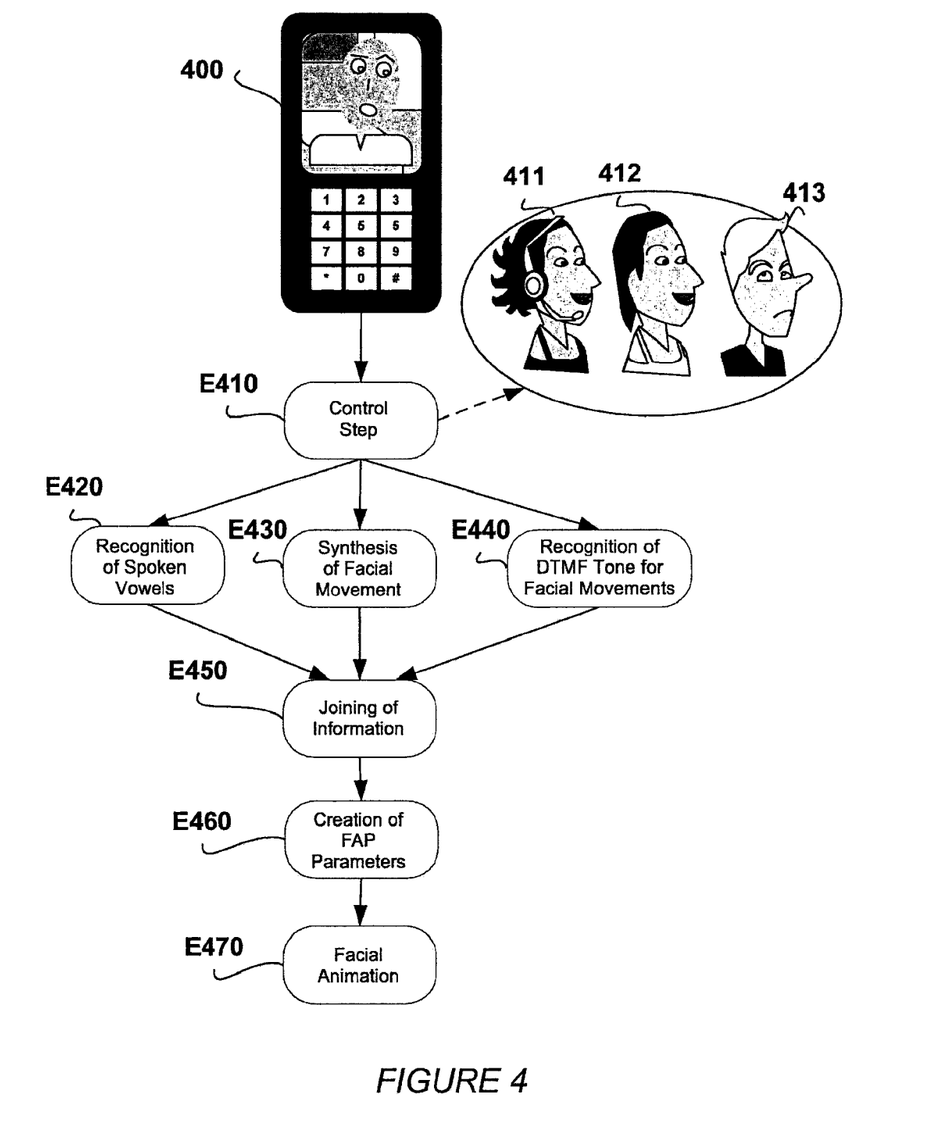
FIG. 4 illustrates an overview of exemplary functionality according to methods consistent with aspects of the innovations herein.

Further features and methods consistent with the innovations herein are shown in FIG. 4. The system in which that method can be implemented may comprise a portable device, as represented by reference 400, integrated to a method for audio processing and generation of animation of the virtual humanoid.

The first step of the method, represented by E410, controls the application of voice recognition and position of the head. Depending on user customization, a specific avatar is used for communication within a set of avatars 411-413. For example, when making a call to a self-service for a female individual and for a male individual avatars 411, 412, 413, respectively, are used.

After this, the steps are performed for the recognition of spoken vowels E420, synthesis of facial motion E430 and recognition of DTMF tones E440. For example, when the remote user is speaking, the step E420 performs the recognition of spoken vowels and in step E430, the movements of the eyes are animated throughout the call. Upon receiving a DTMF tone, in step E440, it is performed a change in the type of feature, among a set of twelve standard features, for example.

Figure 5:
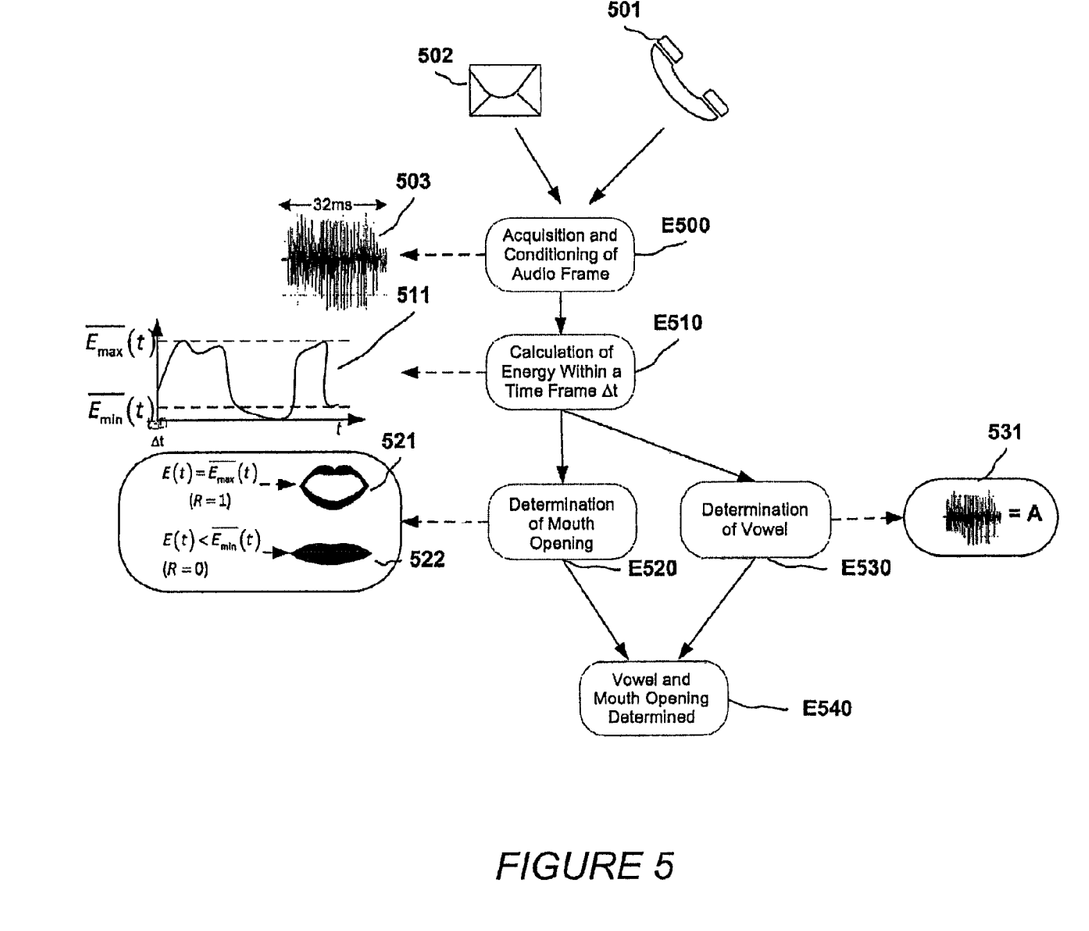
FIG. 5 is a diagram illustrating an exemplary step of recognizing the lip format and extent of the mouth opening consistent with aspects of the innovations herein.

Step E420 is divided into several stages as shown in details in FIG. 5. The first step of this process is the generation of the audio frame, represented by E500. This can be done by sampling the voice received by telephone line 501 or the file available in an MMS message 502. In all cases, an audio frame lasting 32 ms is acquired and, for this time, 512 samples are processed, forming the audio frame 503. For example, regardless of origin, the audio signal is converted into PCM format with 512 samples for every 32 ms, schematically represented by 503. This conversion is done through the code implemented in the DSP of the portable device.

Recognition of the Mouth Opening

After this step, data conditioning is performed calculating the energy of the voice signal in each acquired frame at step E510. Each value is placed in a buffer and calculated the maximum energy in the past N ms represented by $\overline{E_{Max}}$, as illustrated at 511, where N varies between 0.5 and 1.5 seconds, being in one implementation the value of ~1 second.

Typically, the energy of the mouth varies in pronouncing various phonemes. For example, to sustain a phoneme, the energy is maximum and during pauses between words, energy is practically zero. Because of this, we calculate the minimum energy for the detection of voice $\overline{E_{Min}}$ as a fraction of $\overline{E_{Max}}$. This ratio can vary from 1% to 50%, being preferably used the value of 10%. When energy is less than this minimum, it indicates that the user is not talking, keeping the avatar with the mouth closed.

If the animation was done only as a function of RMS value of energy, it would require to set minimum and maximum value. Thus, a person speaking low would make a small motion on the lips of the avatar.

This ratio between $\overline{E_{Min}}$ and $\overline{E_{Max}}$ allows for recognition and mouth opening regardless of the intensity of voice. The shape of the mouth, regardless of the user speaking softly or loudly, will adapt to facial animation depending on the ratio $\overline{E_{Min}}/\overline{E_{Max}}$.

When energy is greater than a specified threshold, exemplary methods of the present innovations may perform the processing of audio frame to identify the amplitude of mouth opening in step E520 and the spoken vowel at step E530.

Thus, the ratio of the maximum energy and the energy of current frame is used to control the size of mouth opening. For example, when energy is equal to $\overline{E_{Max}}$, it is assigned the maximum opening, as shown in step 521. When energy is less than $\overline{E_{Min}}$, it is assigned to closed mouth. At moment the energy is greater than $\overline{E_{Min}}$ and less than $\overline{E_{Max}}$, the mouth is drawn according to the above-mentioned ratio.

Recognition of Spoken Vowels

After this calculation, at step E520, the shape and size of mouth opening are determined. The same audio frame is processed to extract features that can identify the type of vowel that was spoken and has its operation detailed in FIG. 6.

Figure 6:
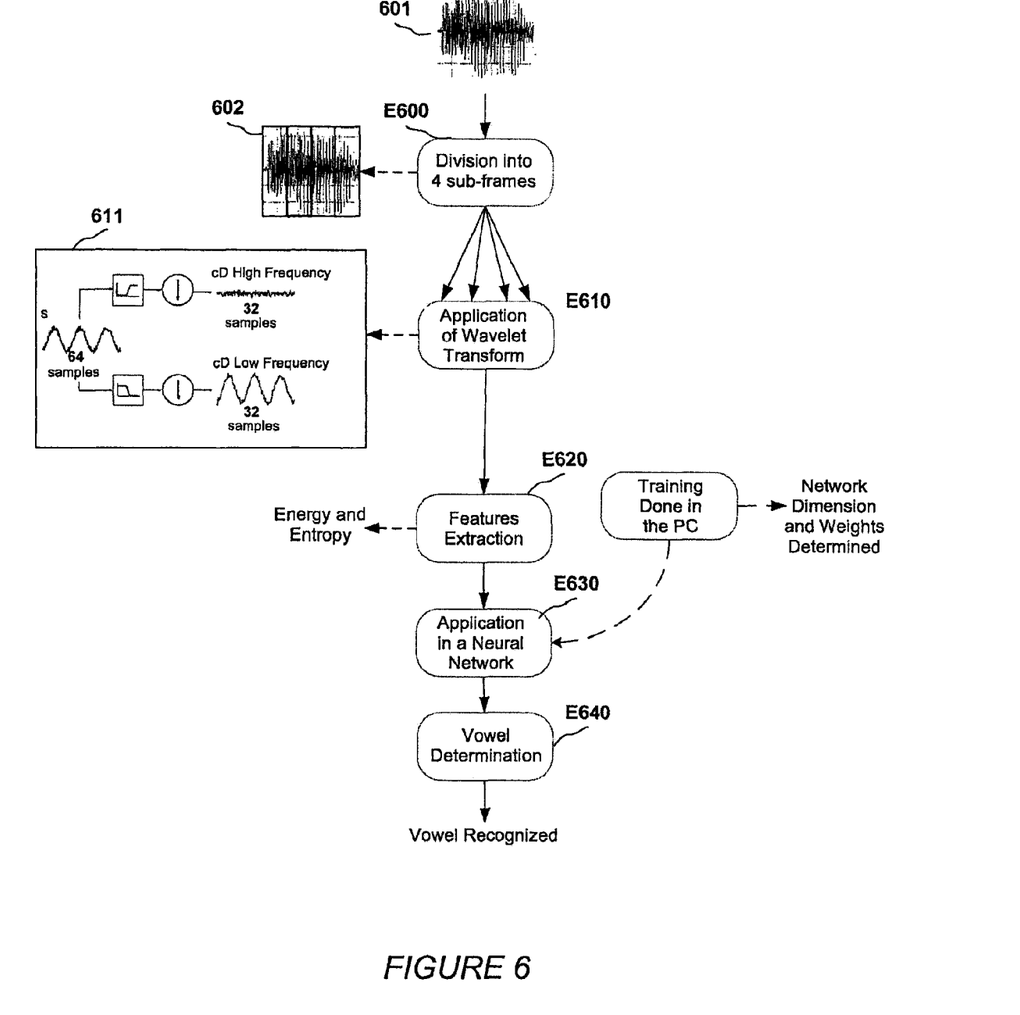
FIG. 6 is a diagram illustrating an exemplary step of recognizing lip shape using Wavelets and Neural Network features consistent with aspects of the innovations herein.

As a voice signal can be considered stationary within a time window around 10 ms. At step E600, the frame E601 is divided into sub-frames, as shown in step E602. In each of these frames, voice characteristics are extracted through the blocks E610 and E620.

At the step E620, it is performed the feature extraction, such as using a multi-scale non-standard wavelet. According to an exemplary implementation of the innovations herein, the analysis of a signal via Wavelet Transform may be done by multiple convolution of two functions (scaling and wavelet) as the approach of the Fast Wavelet Transform (FWT—Fast Wavelet Transform).

It is important to mention that the repeated application of these functions is computationally complex in an image. This is due to the large number of pixels in an image. On the other hand, the processed audio signal has only 64 samples. Even applying successive convolutions (for the calculation of various levels) the computational cost is low.

The Fast Wavelet Transform performs the decomposition of a signal by convolution of the signal followed by a sub-sampling. At step E610, the calculation is performed at various levels, as shown in step 611.

The energy $E^j$ from one level j to all levels of the Wavelet Transform can be calculated from the sum of the squares of the detail coefficients.

According to this exemplary implementation, at step E620, besides energy $E^j$, it is calculated the total energy $E^t$ and residual entropy wavelet $H^j$, respectively described by:

$$E^{tot} = \sum_{j}^{J_{max}} E^j, \qquad (1)$$

$$H^j = -\frac{E^j}{E^{tot}} \cdot \log \frac{E^j}{E^{tot}}. \qquad (2)$$

To reduce the computational effort in calculating the feature extraction and improving the computational effort, consistent with the present innovations, the energy may be calculated for specific levels of decomposition. The characteristics can be calculated in any combination between the levels of processed, 1 to $J_{max}$, are used levels 1, 3, 4 and 5 to calculate the coefficients, the choice of not to use a specific level made through tests with various combinations of features to determine which combination presents the best performance.

After this calculation, at step E630, the features are implemented in a progressive neural network, trained with the backpropagation algorithm. This neural network has, in one exemplary implementation, N neurons in the input layer (N=number of characteristics to be used), eight in the hidden layer and six in the output layer, where the first five outputs indicate each type of vowel and the sixth output indicates the absence of a vowel. In the recognition step, the value of the output with the highest intensity is considered a spoken vowel.

Synthesis of Facial Expressions

In following, it is described the method of artificial generation of eye movements and look, represented by E430. To blink, the eye closed profile is applied at step E430, after 100 milliseconds it is applied the profile of open eye again to simulate the blinking of the eyes. Then, it is selected a random integer value between 3000 and 4500 and uses it as time in milliseconds between the current and the next blink, procedure being repeated.

To control the movements of the eyeball, a similar processing is made. In this case, the control is done by applying small rotation angles to the sides. These angles are random values between −5 and 5 degrees which are applied simultaneously to both eyes in a random time interval between 100 and 1000 milliseconds.

Recognition of DTMF Tones for Animating Facial Movements

In the following, it is described the step of recognition of DTMF tones for animation of virtual humanoid facial features, represented by E440. The recognition of DTMF tones is known to one of ordinary skilled in the art, and can be implemented using a single digital band-pass filter for each frequency. When a pair of tones is recognized, the value of the number entered is identified, determining which action is desired.

For this, some profiles are defined by expressions that are applied when a corresponding command is triggered. The profile of animation can be related to emotions such as happiness, sadness, anger, boredom, fear, confusion, sarcasm, and may also be related to head movements, for example, "yes and no", or isolated movements of the face, such as showing the tongue, raising eyebrows, among others. Thus, upon receiving the DTMF tone corresponding to a number, the command "to be happy" is sent to step of joining information, represented by E450.

Joining Information

At this step, the priorities among the different types of recognition are assessed. For example, with regard to the lip movements, recognition of spoken vowel E420 has priority in the generation of facial gesture, that is, upon receiving a command to display the tongue, the humanoid will only show the tongue while the user does not speak. At the moment the user starts talking, the motion of the mouth is made only by the vowels.

Moreover, some of the profiles are temporary and others are permanent. For example, movements such as "yes and no" are temporary, while emotions such as sadness, happiness or normal state are permanent. Temporary movements have finite duration, i.e., the avatar shakes his head indicating yes for 5 seconds and return to its previous state. Thus, the step E450 performs the control of which feature is held so that, right after, FAP parameters are generated at step E460, which then will be animated at step E470.

Creation of FAP Parameters

The step of formation FAP parameters E460 is described below. The animation is based on a set of characteristic points of the face or Feature Points (FP). The MPEG4 encoding using 84 FP in total, which, according to the an exemplary implementation of the innovations herein, a subset of thirty-three points are used. For example, the encoding proposes eighteen FP for the lips. However, eight characteristic points only can efficiently animate lips.

According to another implementation, only three FP are used for head motion, six for the mouth, four for each eye, three for each eyebrow, five for the nose, one for the chin and two for each cheek. The main FPs are shown in FIG. 7.

Figure 7:
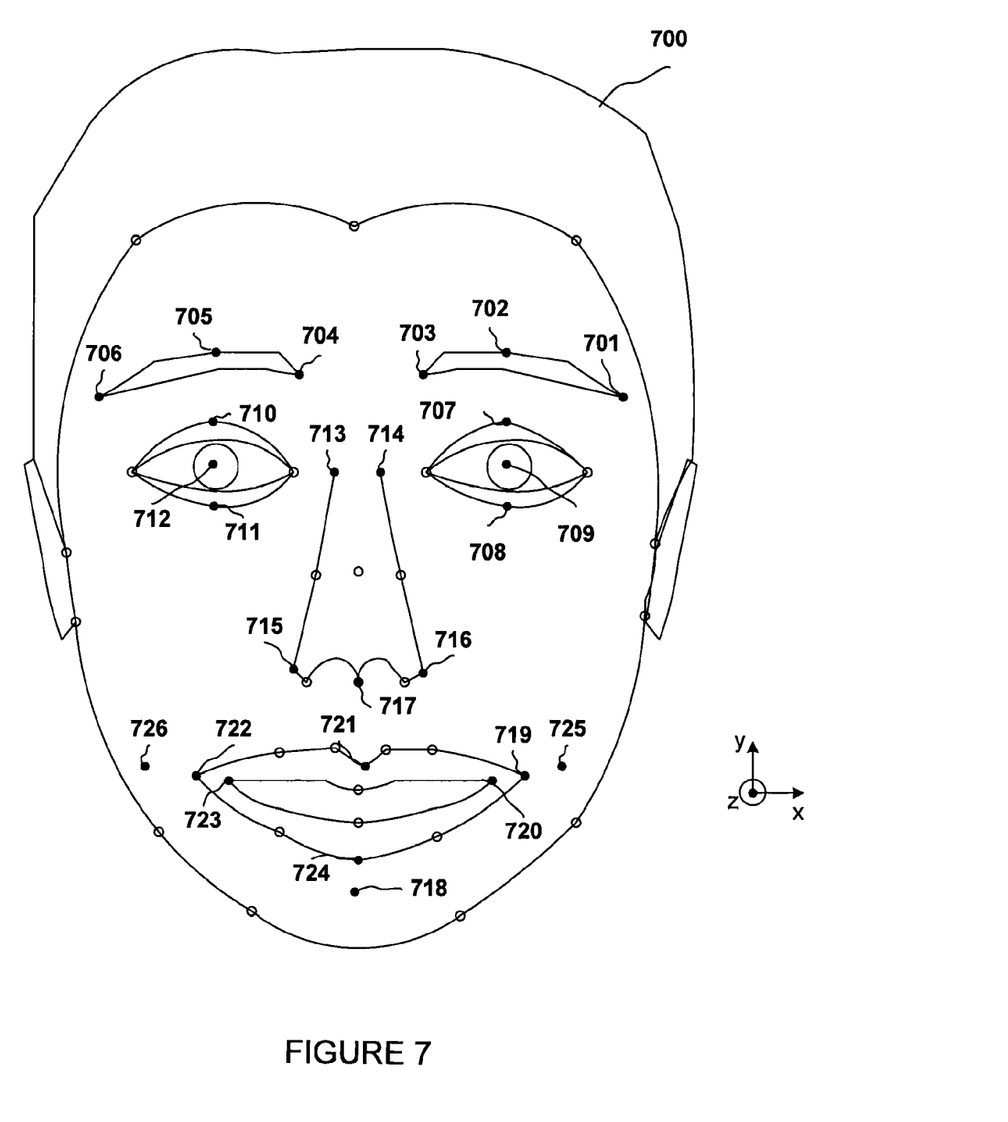
FIG. 7 is a front view of the virtual humanoid illustrating characteristic points of facial animation consistent with aspects of the innovations herein.

In FIG. 7, some FPs are plotted with a full ball (701-726) and others with an empty ball. The former are used directly in the animation, that is, they are moved by the FP in certain directions. The latter are not affected by FPs and remain static during the whole process of animation. The function of the static points is to serve as a limit for the deformation of the humanoid's face when a non-static FP is moving.

For example, upon receiving the viseme of the vowel "O", the step E470 specifies the six end points of the mouth to simulate a circle. The FAP parameters use as the basis the shift of FP for changing in geometric shape of facial model.

The neutral face is defined as a system of coordinates of the right hand (positive X-axis to the right, positive Y-axis up and positive Z-axis out of paper). When the face "looks" to the positive Z direction, all the facial muscles are relaxed, eyelids tangent to the iris, pupil measuring a third of pupil size on the model, lips closed forming a horizontal line from end to the other of the mouth.

Differently from the known solutions, consistent with the present disclosure, the offsets are always relative to the FP in the neutral face, and not with respect to the previous position. This avoids the loss of one frame of animation compromises the subsequent frames.

Each profile of the facial animation comprises the PF index and the displacement of each index with respect to neutral face, one for each axis, dx, dy and dz. For example, to make the avatar close his eyes, four FPs are used and twelve shifts.

Moreover, with regard to the mouth, only five possible configurations are used, one for each vowel and neutral profile (initial position). From the profiles, the respective FAP is generated and this is passed to animation step E470.

Facial Animation in Portable Devices

For the animation, the modification of each FP affects other points around the same. This forms a region of influence for each FP. The points affected are calculated using a method known, in which the displacement of each point will be given by a weighted average of the displacements of its FP influencers. Thus, from all mentioned points, it is obtained the displacement of each of these points with respect to the current point. When the difference is greater than a tolerance limit, the points of the model are modified and it is possible to animate the desired features.

Features and Functionality

Systems and processes are disclosed for animating virtual heads/faces via voice processing in portable devices.

Regarding an exemplary process, there is provided a method for animating a virtaul head/face/character, which may include synthesis of lip motion, as a function of voice processing in a portable device. Moreover, the method may include:

processing information associated with setup, one or more user settings, and/or one or more user preferences. Here, for example, an initial process may be performed (E410) for communication, setup, evaluation of personal choices of the user, association of an avatar from a set of virtual humanoids available on the portable device, etc.

processing or acquiring audio data. Here, for example, audio data in any standard format may be acquired and/or processed.

analyzing audio information, such as audio strength or energy, in an audio frame. Here, for example, systems and methods may analyze audio data energy (E510) in a fixed amount of samples that form an audio frame, wherein a relationship between the energy of the current frame and the previous one is calculated within a time window to determine a movement of the virtual feature, such as an extent/size that a mouth of a virtual face is open.

performing voice, sound or vowel recognition. In one exemplary implementation, spoken vowels or other specified sounds may be recognized (E420) via analysis of audio frames for recognizing such features. Here, for example, such recognition may be achieved via the extraction of features from the audio signal and application in a progressive neural network with fixed weights, wherein such extraction aspects may be generated from a training done out of the portable device, using a set of audio samples.

generating/synthesizing expressions. Here, for example, this generating/synthesizing step (E430) may automatically (or in another arbitrary or artificial manner) generate specific facial expressions or gestures that simulate natural movements made by a person.

recognizing or processing tone information for use in animation of head/facial gestures. Here, for example, aspects of the innovations herein may recognize DTMF tones received in the audio channel (E440) for the animation of the head and facial gestures.

joining or processing the synthesized expressions and the recognized information together to provide the displayed animation. In one exemplary implementation, the synthesized information and the recognized information may be processed via a combined process or in a unitary manner, such that the animation is displayed as a function of the combined/unitary processing. Here, the recognized DTMF tones and the automatically generated may be joined (E450) to form unitary information that will be used during the animation of the virtual face/character, where analysis of priorities between each received information may also be performed. For example, innovations herein may acknowledge that vowels have a higher priority than facial features recognized/provided in response to DTMF tones.

creating facial animation parameters as a function of the information joined or combined, above. Here, for example, facial animation parameters may be generated by converting instructions on FAP parameters (E460), using the information processed or defined in the previous step animating a virtual head/face/character by modifying the features of the character as a function of the generated facial animation parameters. Here, for example, the animation may be achieved by modifying the features as a function of FAP parameters derived as set forth herein.

While various implementation of the present disclosure have been described above, it should be understood that they have been presented by way of example only, and not limitation. It will be understood by those skilled in the art that various changes in form and details may be made therein without departing from the spirit and scope of the disclosure. Thus, the breadth and scope of the disclosure should not be limited by any of the above-described exemplary implementations.

The invention claimed is:

1. A method for animating virtual faces/heads/characters via voice processing in a portable device, the method comprising:
processing information associated with setup, a user setting, and/or a user preference;
processing, acquiring, or analyzing audio information associated with the portable device;
performing voice, sound, or vowel recognition of the audio information by generating a plurality of audio frames based on the audio information;
calculating a maximum energy among the plurality of audio frames;
synthesizing facial expressions as a function of the audio information;
recognizing Dual-Tone Multi-Frequency (DTMF) tone information for use in animation of head/facial expressions;
joining the synthesized expressions and the recognized information together to determine relevant animation features;
generating facial animation parameters as a function of the information joined; and
animating a virtual head/face/character by modifying features thereof as a function of the generated facial animation parameters,
wherein a ratio of the maximum energy and an energy of a current frame is used to control a size of a virtual mouth opening.

2. The method of claim 1, wherein the performing voice, sound, or vowel recognition comprises generating the audio frame via sampling the voice received by telephone line or from a file available in an MMS message.

3. The method of claim 2, wherein an audio frame lasting about 32 ms is acquired and, for such duration, about 512 samples are processed, wherein the audio frame is formed, and conversion is made via a DSP code implemented in the portable device.

4. The method of claim 1, wherein the calculating the maximum energy comprises calculating the energy of the voice signal in each acquired frame, each value is placed in a buffer and the maximum energy is calculated in the last N ms ($\overline{E_{Max}}$), where N varies between about 0.5 and about 1.5 seconds, or is 1 or about 1 second.

5. The method of claim 4, wherein a minimum power to detect voice $\overline{E_{Min}}$ is calculated as a ratio of $\overline{E_{Max}}$, wherein this ratio ranging from about 1% to about 50%, or about 10%.

6. The method of claim 1, wherein, besides an energy $E^j$, a total energy $E^{tot}$ is calculated and an entropy residual wavelet $H^j$ are calculated, respectively described by:

$$E^{tot} = \sum_{j}^{j_{max}} E^j, \quad (1)$$

$$H^j = -\frac{E^j}{E^{tot}} \cdot \log\frac{E^j}{E^{tot}} \quad (2)$$

in which the energy is calculated for specific levels of decomposition and characteristics can be calculated in any combination between the transform levels 1 until $J_{max}$, where the levels 1, 3, 4 and 5 are used to calculate the coefficients.

7. The method of claim 6, wherein, after the calculation of $E^{tot}$ and $H^j$, the relevant animation features are applied in a progressive neural network, which has, in one exemplary implementation N neurons in the input layer, about 8 in the hidden layer and about 6 in the output layer, where the first five outputs indicate each type of vowel and the sixth output indicates the absence of vowel.

8. The method of claim 1, wherein a control of movements of a pair of eyes on the face is made by applying small rotation angles to the sides of the eyes, these angles having random values between about −5 and about 5 degrees, which are applied simultaneously to both eyes in a random time interval between about 100 and about 1000 milliseconds.

9. The method of claim 1, wherein at the joining, some of the profiles are temporary and others are permanent.

10. The method of claim 1, wherein the generating the Facial Animation Parameters (FAP) is based on a set of characteristic points of the face or Feature Points (FP).

11. The method of claim 10, wherein some of those characteristic points of the face are used directly in the animation in certain directions.

12. The method of claim 1, wherein offsets are always made with respect to the Feature Point (FP) in the neutral face and not with regard to the previous position, preventing the loss of an animation frame compromising the subsequent frames.

13. The method of claim 1, wherein each facial animation profile comprises an FO index and a displacement of each index relative to the neutral face, one for each axis, dx, dy, and dz.

14. The method of claim 1, wherein, for the mouth, only five possible configurations are used, one for each vowel and a neutral profile (initial position), and from such profiles, the respective Facial Animation Parameter (FAP) is generated and this is passed to the animating.

15. The method of claim 1, wherein, for the animation, a modification of each Feature Point (FP) influences other points around the same, forming a region of influence for each FP, in which the influenced points are calculated by a displacement of each point based on a weighted average of the displacements of its FP influencers, a verification of the displacement of each of these point with respect to a current point is made from all mentioned points.

16. The method of claim 1, wherein animation of movements of the head, selection of features, and/or recognition of lip movements are provided.

17. The method of claim 1, wherein features for recognition of spoken vowels in different accents are adapted to be extracted.

18. A system comprising a portable device and/or one or more computing/processing components configured to implement the method of claim 1.

19. A non-transitory computer readable medium having computer readable instructions embodied therein to implement the method of claim 1.

* * * * *